(12) United States Patent
Dyke et al.

(10) Patent No.: US 9,073,474 B2
(45) Date of Patent: Jul. 7, 2015

(54) BARRIER TRANSPORT SYSTEM

(71) Applicant: LINDSAY TRANSPORTATION SOLUTIONS, INC., Omaha, NE (US)

(72) Inventors: Gerrit A. Dyke, Stockton, CA (US); Thomas S. Dennis, Phoenix, AZ (US); Christopher J. Clouser, Placerville, CA (US)

(73) Assignee: LINSAY TRANSPORTATION SOLUTIONS, INC., Omaha, NE (US)

( * ) Notice: Subject to any disclaimer, the term of this patent is extended or adjusted under 35 U.S.C. 154(b) by 148 days.

(21) Appl. No.: 14/022,332

(22) Filed: Sep. 10, 2013

(65) Prior Publication Data

US 2015/0071748 A1    Mar. 12, 2015

(51) Int. Cl.
*B60P 3/40* (2006.01)
*E01C 19/52* (2006.01)

(52) U.S. Cl.
CPC .. *B60P 3/40* (2013.01); *E01C 19/52* (2013.01)

(58) Field of Classification Search
CPC .................................. B60P 3/40; E01C 19/52
USPC .......................................... 404/6, 73; 414/458
See application file for complete search history.

(56) References Cited

U.S. PATENT DOCUMENTS

| | | | |
|---|---|---|---|
| 4,500,225 A | 2/1985 | Quittner | |
| 4,624,601 A | 11/1986 | Quittner | |
| 4,632,598 A * | 12/1986 | Richards | 404/6 |
| 4,666,332 A | 5/1987 | Burgett | |
| 4,881,845 A | 11/1989 | McKay | |
| 4,955,753 A | 9/1990 | McKay | |
| 5,007,763 A | 4/1991 | Burgett | |
| 5,088,874 A * | 2/1992 | Quittner | 414/460 |
| 5,720,572 A | 2/1998 | Richer | |
| 6,413,009 B1 | 7/2002 | Duckett | |
| 6,832,870 B1 * | 12/2004 | Krivoy | 404/6 |
| 6,984,088 B1 * | 1/2006 | Krivoy | 404/6 |
| 7,168,881 B2 | 1/2007 | Hartlauer | |
| 7,566,187 B2 | 7/2009 | Dyke et al. | |
| 2007/0160420 A1 | 7/2007 | Aoki | |

* cited by examiner

*Primary Examiner* — Raymond W Addie
(74) *Attorney, Agent, or Firm* — Thomas R. Lampe

(57) ABSTRACT

A system for transporting a barrier having a plurality of barrier modules having passageways extending therethrough by employing a barrier transport vehicle inserted in the passageways to lift the barrier modules and move the barrier.

27 Claims, 9 Drawing Sheets

BARRIER TRANSPORT SYSTEM

TECHNICAL FIELD

This invention relates to a system for transporting a barrier comprised of a plurality of barrier modules. The invention encompasses both apparatus and a method.

BACKGROUND OF THE INVENTION

It is well known to move roadway barrier segments or modules disposed end to end from one location to another. In some instances, the roadway barriers form an articulated barrier string, the barrier modules or segments being pivotally connected together. It is well known to incorporate wheels in the modules which allow the barrier to be towed from one location to another and also may be utilized to change the configuration of the barrier. Typically, the wheels are retracted after the barrier has been moved to ensure that it is not readily dislodged or moved by vehicle impact for example.

It is also well known to use self-powered wheeled machines to pick up and move roadway barrier segments disposed end to end from one location to another. Some of these roadway barrier moving machines move along a string of roadway barrier segments, with a conveyor system of the machine engaging an outer surface or surfaces of the segments to lift the segments and transfer the string from one side of the machine to the other while the machine moves. One example of such a barrier transfer machine is manufactured by Lindsay Transportation Solutions, 180 River Road, Rio Vista, Calif. and made available under the Barrier Systems and Quick Change trademarks. Barrier transfer machines are typically steered and operated either solely by manual control or manual control in conjunction with infrastructure modifications such as above or below grade guide wires or magnetic tape. Machines of this nature are characterized by their large size and typically do not readily lend themselves to use in confined or restricted operating situations and conditions.

A patentability search directed to the present invention located the following prior art: U.S. Pat. No. 7,168,881, issued Jan. 30, 2007, U.S. Pat. No. 5,007,763, issued Apr. 16, 1991, U.S. Pat. No. 4,666,332, issued May 19, 1987, U.S. Pat. No. 7,566,187, issued Jul. 28, 2009, U.S. Pat. No. 4,955,753, issued Sep. 11, 1990, U.S. Pat. No. 5,720,572, issued Feb. 24, 1998, U.S. Pat. No. 6,413,009, issued Jul. 2, 2002, U.S. Pat. No. 4,881,845, issued Nov. 21, 1989, U.S. Pat. No. 4,624,601, issued Nov. 25, 1986, U.S. Pat. No. 4,500,225, issued Feb. 19, 1985 and U.S. Patent App. Pub. No. US 2007/0160420, published Jul. 12, 2007.

The invention disclosed and claimed herein is not taught or suggested by the above references.

DISCLOSURE OF INVENTION

The present invention relates to a system including a barrier transport vehicle for transporting a barrier comprised of a plurality of barrier modules, each barrier module including downwardly extending side portions having distal ends for positioning on a roadway or other support surface to support the barrier module.

The barrier module additionally has an inner surface defining a passageway extending through the barrier module between the side portions along the roadway or other support surface when positioned thereon.

The barrier transport vehicle comprises a plurality of interconnected barrier transport vehicle modules for positioning in the passageways of barrier modules of the barrier and for engagement with the inner surfaces of the barrier modules to lift the engaged barrier modules off the roadway or other support surface and allow transport of the barrier by the barrier transport vehicle.

The system of the invention also encompasses a method of transporting a barrier comprised of a plurality of barrier modules, each barrier module including downwardly extending side portions having distal ends for positioning on a roadway or other support surface to support the barrier module, and the module having an inner surface defining a passageway extending through the module between the side portions above and along the roadway or other support surface when positioned thereon.

The method includes the step of locating a barrier transport vehicle comprising a plurality of interconnected barrier transport vehicle modules on the roadway or other support surface.

The barrier transport vehicle is then moved while on the roadway or other support surface and the barrier transport vehicle is caused to be positioned in the passageways of barrier modules of the barrier.

The method also includes the step of causing engagement between the barrier transport vehicle modules and the inner surfaces of the barrier modules to lift the engaged barrier modules off the roadway or other support surface.

The barrier transport vehicle is then employed to transport the barrier while the engaged barrier modules are elevated relative to the roadway or other support surface.

Other features, advantages and objects of the present invention will become apparent with reference to the following description and accompanying drawings.

MODES FOR CARRYING OUT THE INVENTION

Referring now to the drawings, the invention illustrated relates to the transport of an articulated barrier comprised of a plurality of barrier modules 10 of a certain type pivotally connected together at the ends.

Each barrier module includes downwardly extending side portions 12, 14 having distal ends for positioning on a roadway or other support surface to support the barrier module.

Each barrier module 10 additionally has an inner surface 16 which defines a passageway 18 extending through the barrier module between the side portions along the roadway or other support surface.

The particular construction of barrier module 10 illustrated in the drawings will be described in more detail below.

According to the teachings of the invention, a barrier transport vehicle is utilized for transporting a barrier comprised of the plurality of barrier modules 10. A first embodiment of the barrier transport vehicle is designated by reference numeral 20 and is shown in FIGS. 1-5, 11 and 12. This embodiment of the barrier transport vehicle at the invention is designated by reference numeral 20.

Barrier transport vehicle 20 comprises a plurality of interconnected barrier transfer vehicle modules for positioning in the passageways of barrier modules 10. The barrier transport vehicle 20 includes endmost barrier transport vehicle modules 22, 24 and intermediate barrier transport vehicle modules 26 disposed between the end-most barrier transport vehicle modules 22, 24. The barrier transport vehicle modules 22, 24, 26 are connected together by pivot connectors 28, thus, the barrier transport vehicle is an articulated, train-like vehicle.

Figures 4, 5, 6:
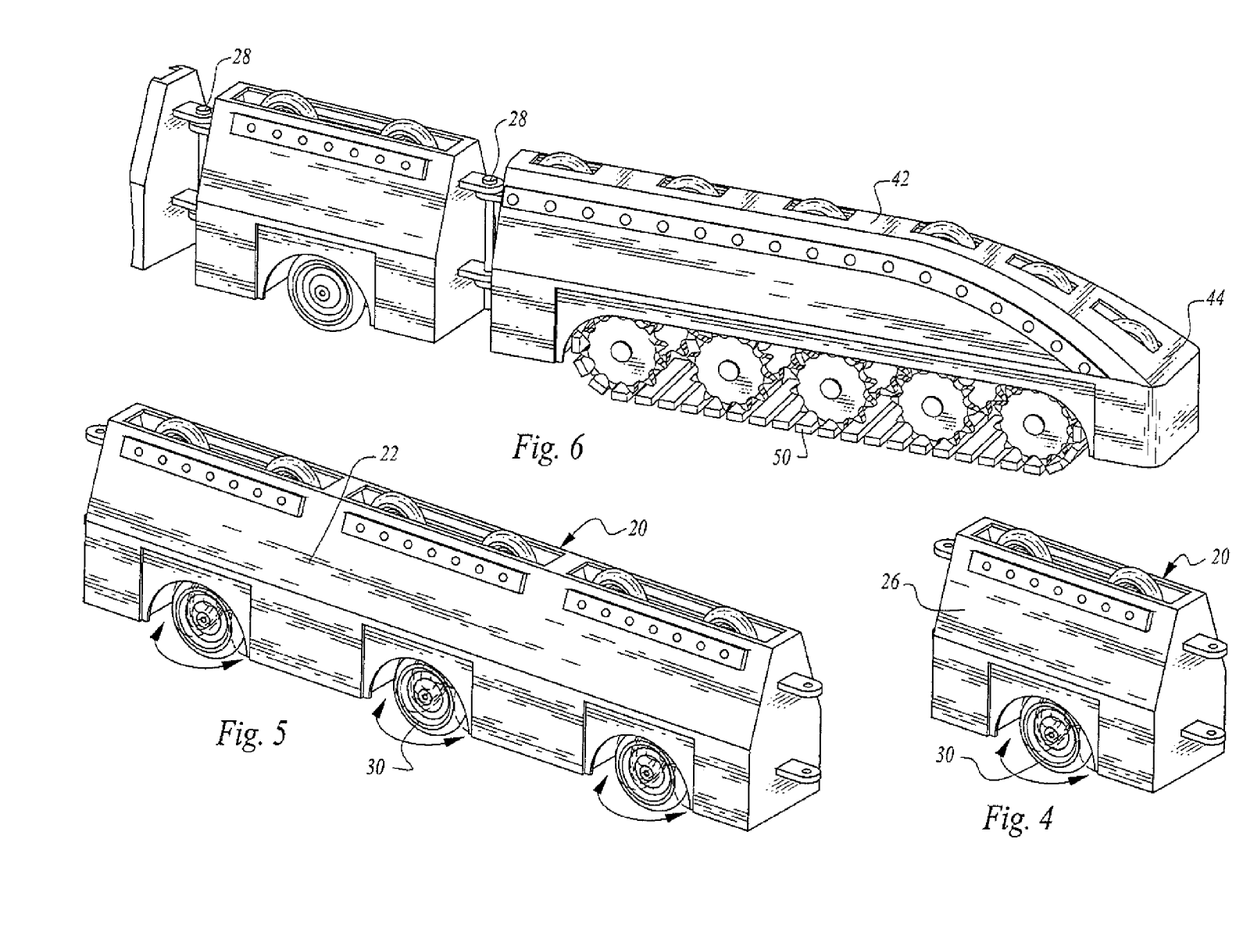
FIG. 4 is an enlarged perspective view of a single intermediate barrier transport vehicle module and illustrating movement of wheels associated therewith to steer the module.
FIG. 5 is a view similar to FIG. 4, but illustrating one of the endmost barrier transport vehicle modules, this figure also illustrating the ability of wheels of the module to steer.
FIG. 6 is an enlarged, perspective view of an alternative embodiment of the invention wherein the endmost illustrated barrier transport vehicle module has caterpillar treads, the illustrated intermediate barrier transport vehicle module attached thereto being the same as that illustrated in FIG. 4.

All of the barrier transport vehicle modules are provided with steerable structure in the form of wheels 30, three pairs of wheels being associated with each of the end-most barrier transport vehicle modules 22, 24 and one pair of wheels with the intermediate barrier transport vehicle modules 26, of course the numbers of wheels employed may be changed and be of any suitable number. Also, the intermediate barrier transport vehicle modules may vary in length. FIGS. 4 and 5 show by means of double-headed arrows how the wheels may be steered. If desired, this can be done either by remote control using any suitable well known remote control steering mechanism or by use of a sensor in conjunction with infrastructure modification such as above or below grade guide wires or magnetic tape. Manual control of at least some of the barrier transport vehicle modules is also a possibility.

The barrier transport vehicle may include a prime mover to move the barrier transport vehicle. For example, one or both of the end-most barrier transport vehicle modules 22, 24 may include an internal combustion engine or other prime mover to rotate the wheels 30 associated therewith to push and/or pull the intermediate barrier transport vehicle modules. Towing by a separate tow vehicle is another possibility.

Figures 1, 2, 3:
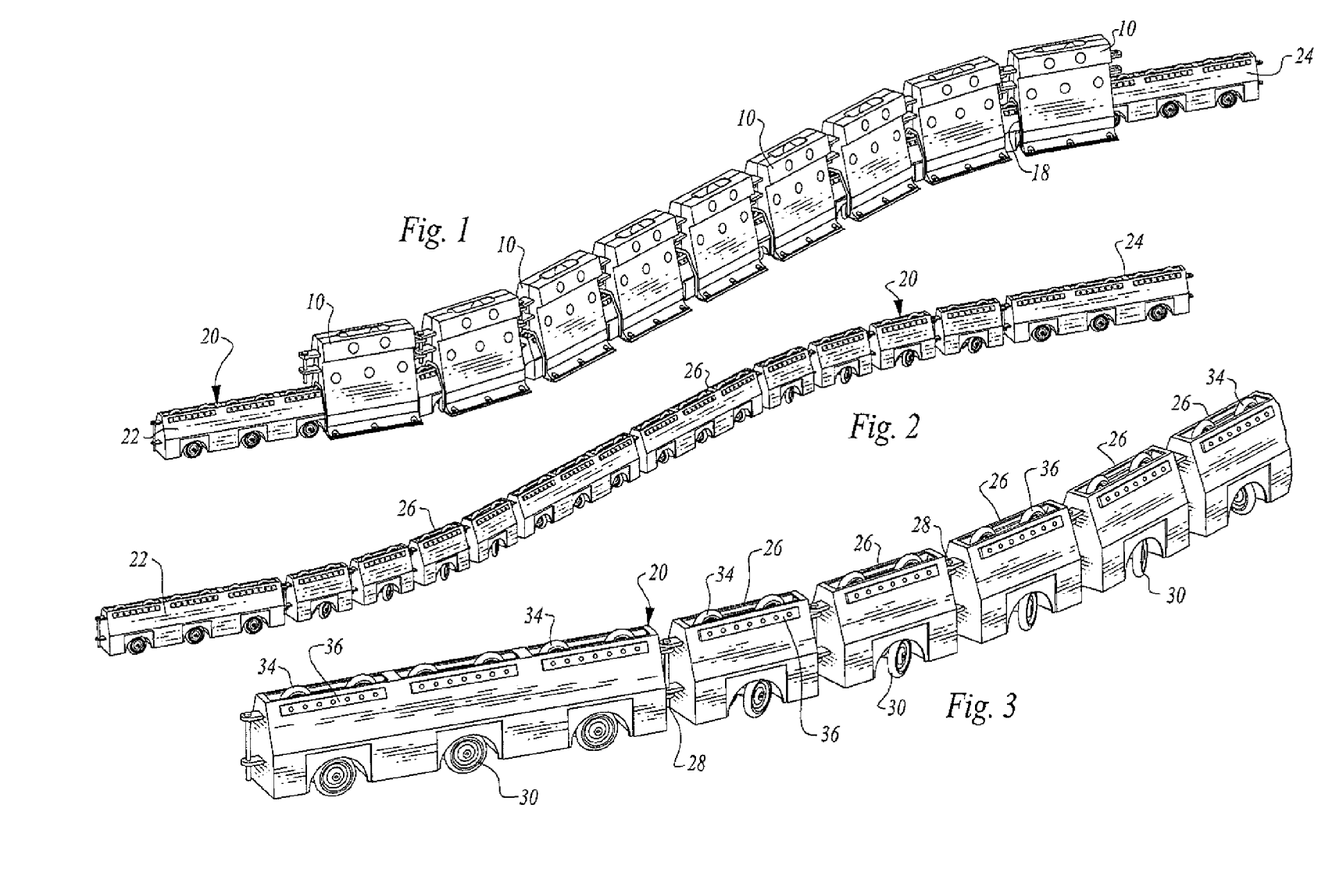
FIG. 1 is a perspective view of a barrier and endmost barrier transport vehicle modules of a barrier transport vehicle constructed in accordance with the teachings of the present invention projecting from the opposed ends of the barrier, the portions of the barrier transport vehicle between the endmost barrier transport vehicle modules not being shown in the interest of simplicity and to show details of the barrier modules.
FIG. 2 is a perspective view of the barrier transport vehicle in its entirety, showing both the endmost barrier transport vehicle modules and the intermediate modules therebetween.
FIG. 3 is a perspective view illustrating an endmost barrier transport vehicle module and five intermediate barrier transport vehicle modules connected thereto.

FIG. 2 shows a representative complete barrier transport vehicle and FIG. 1 illustrates the barrier transport vehicle 10 within the all of the barrier modules, the end-most barrier transport vehicle modules 22, 24 projecting from opposite ends of the barrier. For purposes of clarity, the intermediate barrier transport vehicle modules 26 have not been shown in this figure so that details of the barrier modules and their interrelationship may be seen.

When the barrier transport vehicle 20 is in the position illustrated in FIG. 1 it is in position to support and transport the barrier string consisting of barrier modules 10. It will be appreciated that when the barrier is supported by the barrier transport vehicle 20, the shape of the barrier transport vehicle may be changed since individual steering control of each of the modules would readily enable this to take place.

Both the barrier and the barrier transport vehicle, due to pivotal interconnection of the modules thereof, can be reconfigured and not just transported in the original configuration of the barrier. For such purpose it is desirable, but not necessary, that the lengths of the intermediate barrier transport vehicle modules be substantially the same as the lengths of the barrier modules within which the intermediate barrier transport vehicle modules 26 are positioned. In other words, placement of the pivotal interconnections of the barrier modules should generally correspond to placement of the pivotal interconnection of the intermediate barrier transport vehicle modules.

Figure 11:
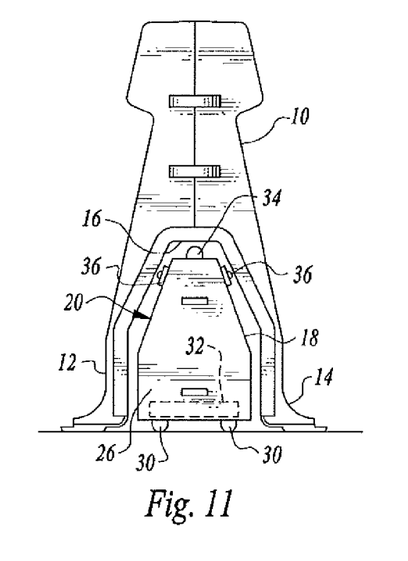
FIGS. 11 and 12 are enlarged end views of a barrier module and respectively showing the operative condition of a barrier transport vehicle module of the first embodiment in non-lifting configuration and lifting configuration, the barrier transport vehicle module in FIG. 12 having lifted the associated barrier module off the roadway.
Figure 12:
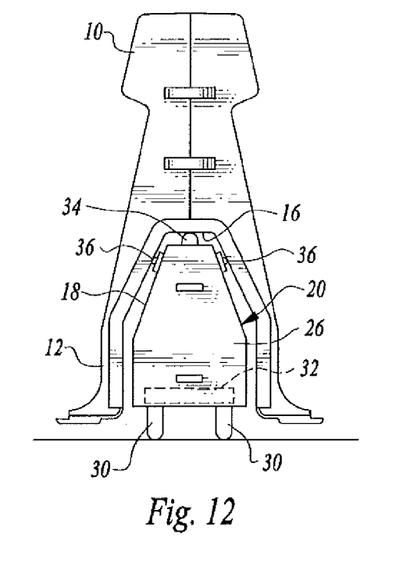
Figure 13:
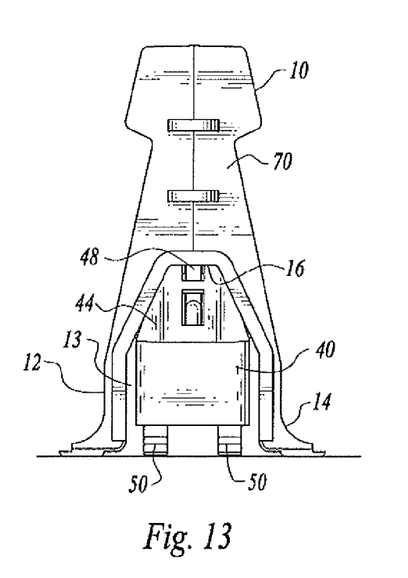
FIGS. 13 and 14 are similar to FIGS. 13 and 14, but illustrating the operation of an endmost barrier transport vehicle module of the second embodiment.
Figure 14:
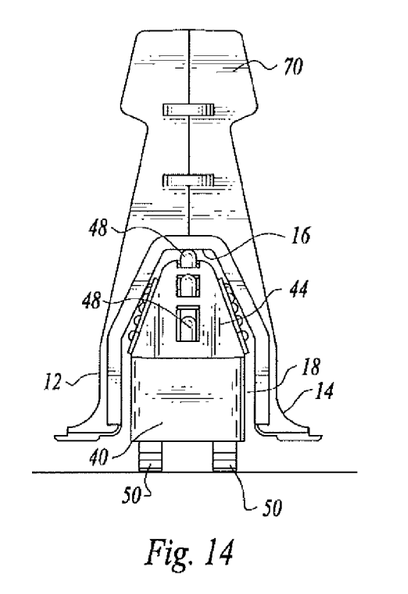
Figure 15:
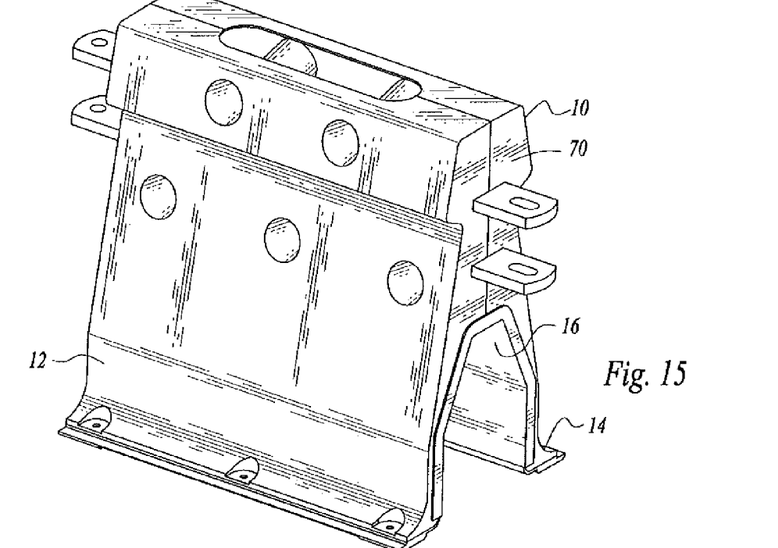
FIG. 15 is a greatly enlarged, perspective view illustrating a barrier module of the present invention having an empty interior.

FIGS. 11 and 12 show an intermediate barrier transport vehicle module 26 in position within the passageway 18 of barrier module 10. In FIG. 11 the module 26 is in lowered condition and in FIG. 12 it is in raised condition, suitable lift or jack structure (shown in dash lines and designated by reference numeral 32) being utilized to raise or lower the module relative to the wheels 30. When raised, the inner surface 16 of the barrier module is engaged by protrusions 34, 36 of the barrier transport vehicle module so that the lifted barrier module 10 cannot move relative thereto. In the arrangement illustrated, the upper protrusions 34 may be in the shape of rollers or wheels which are rotatable during insertion of the barrier transport vehicle modules in place in barrier modules 10 with a suitable locking mechanism being utilized to prevent rotation of the wheels 34 when elevated into contact with the barrier modules. The lock would be released when the height of the barrier transport vehicle modules is lowered.

FIGS. 6-10 show use of a different type of endmost barrier transport vehicle module. Such module at one end is designated by reference numeral 40 while the endmost barrier transport vehicle module at the other end is designated by reference numeral 42. In this arrangement, the barrier transport vehicle module has a tapered end 44.

Figure 7:
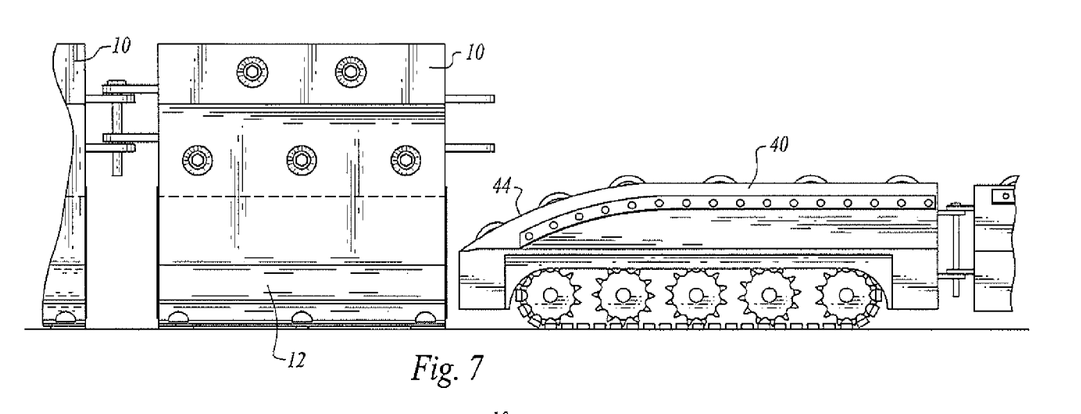
FIG. 7 is a perspective view of an endmost barrier transport vehicle module of the type shown in FIG. 6 just prior to entering the passageway of a barrier module, preparatory to engaging the barrier module and lifting the barrier module.
Figure 8:
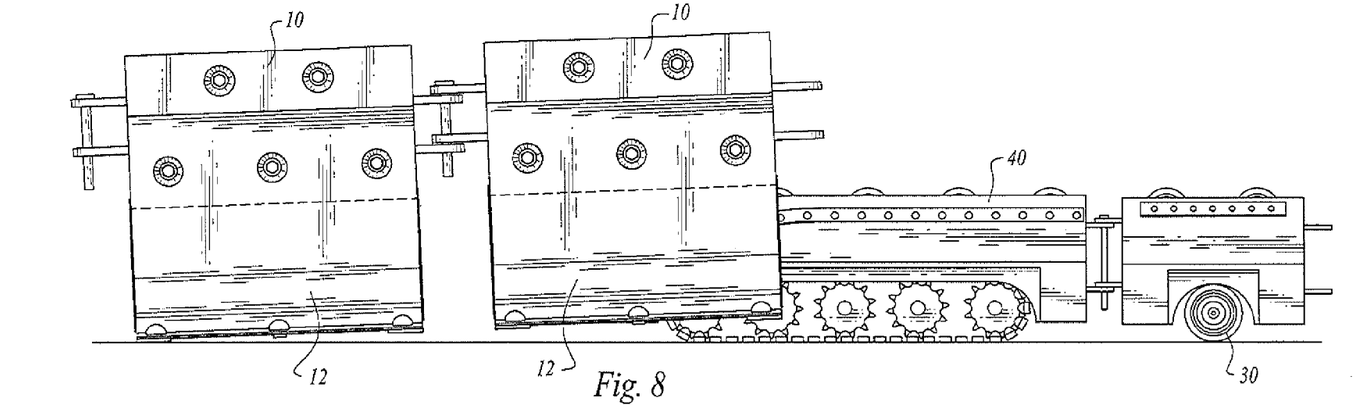
FIG. 8 is a view similar to FIG. 7, but illustrating the endmost barrier transport vehicle module engaging the endmost barrier module and causing the endmost barrier module to be lifted and raised upwardly so that it does not engage the roadway surface.

FIG. 7 shows endmost module 40 approaching an endmost barrier module 10. FIG. 8 shows the tapered end 44 partially in the passageway of the barrier module and engagement between the tapered end with the inner surface of the barrier module operable during continued movement thereof within the passageway to lift the barrier module off the roadway.

Figure 9:
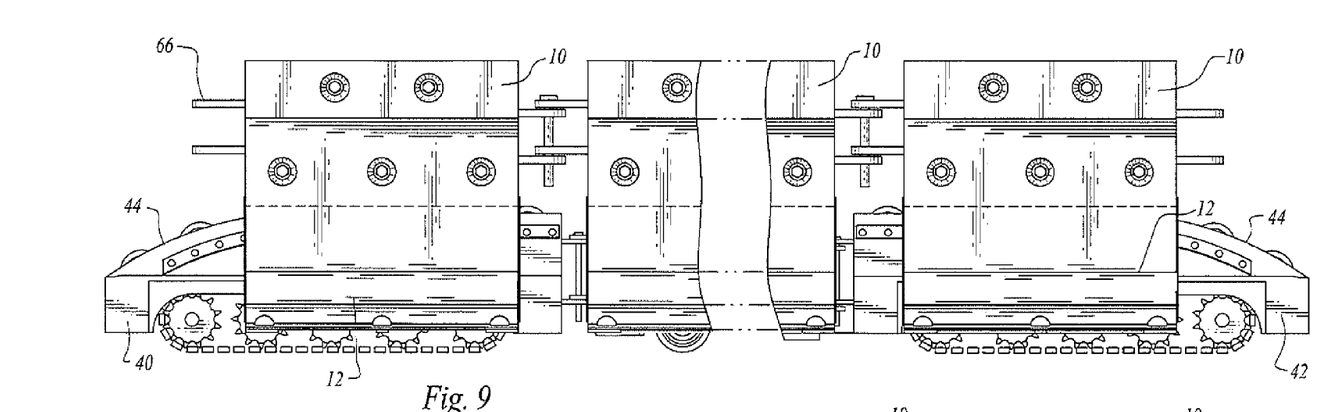
FIG. 9 is a side, elevational, sectional, perspective view illustrating the barrier transport vehicle extended completely through all of the barrier modules of the barrier with the spaced endmost barrier transport vehicle modules projecting from opposed ends of the barrier, the barrier being completely lifted off the ground and being in condition for transport by the barrier transport vehicle.

FIG. 9 shows the barrier transport vehicle including endmost modules 40, 42 in operative position, with endmost module 40 projecting from the left end as viewed in that figure and the endmost module 42 projecting from the other end. FIG. 9 shows the entire barrier string lifted and being transported in the direction of the arrow.

Figure 10:
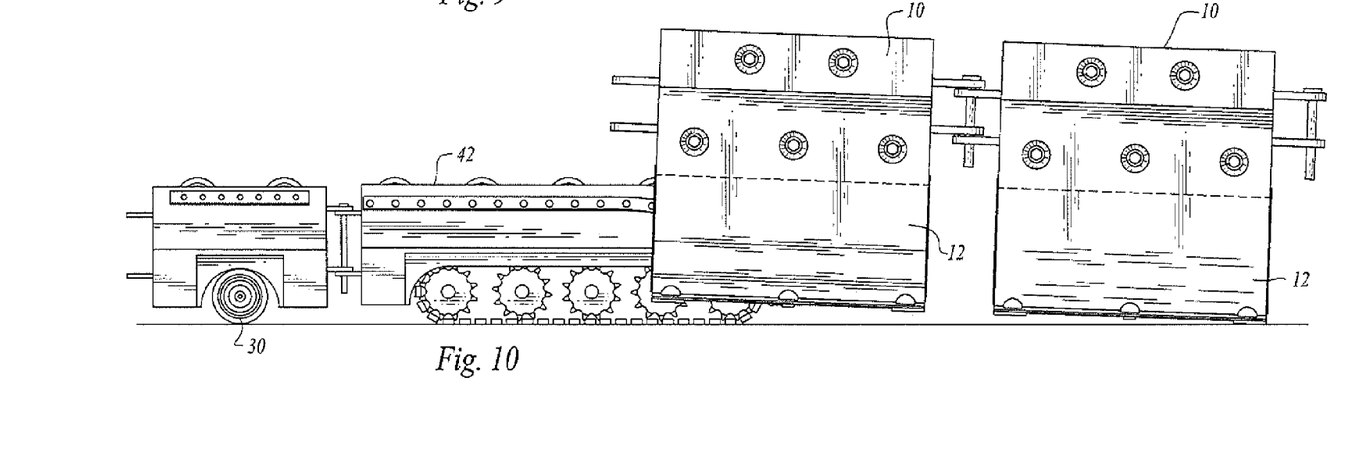
FIG. 10 is a view similar to FIG. 9, but illustrating the barrier having been transported to the desired location, the barrier transport vehicle in the process of being completely disengaged from the barrier and moving in the direction shown by the arrow away from the deposited barrier.

FIG. 10 illustrates the condition of the barrier transport vehicle and the barrier after transport of the barrier has been accomplished, end-most module 42 being shown leaving the last barrier module to complete lowering of the barrier.

In this embodiment of the invention rotatable wheels or rollers 48 are utilized to facilitate passage of the barrier transport vehicle into and out of the passageways of the barrier modules, the rotation of the wheels being stopped utilizing suitable lock means when the barrier transport vehicle is in position for transporting the barrier. Another important difference with respect to this particular embodiment is that caterpillar treads 50, rather than wheels, are employed on the endmost modules to transport the barrier modules and also to change direction of the barrier transport vehicle.

FIGS. 15-21 provide a more detailed illustration of the barrier module 10. In the arrangement illustrated, the module 10 is assembled from housing portions 60, 62 and 64 which may suitably be formed of plastic material. Housing portions 62 and 64 are secured together by bolts and nuts to provide a secure interconnection between those housing portions. Suitable threaded connectors (not shown) may be used to secure housing portion 60 to housing portions 62 and 64.

Figure 16:
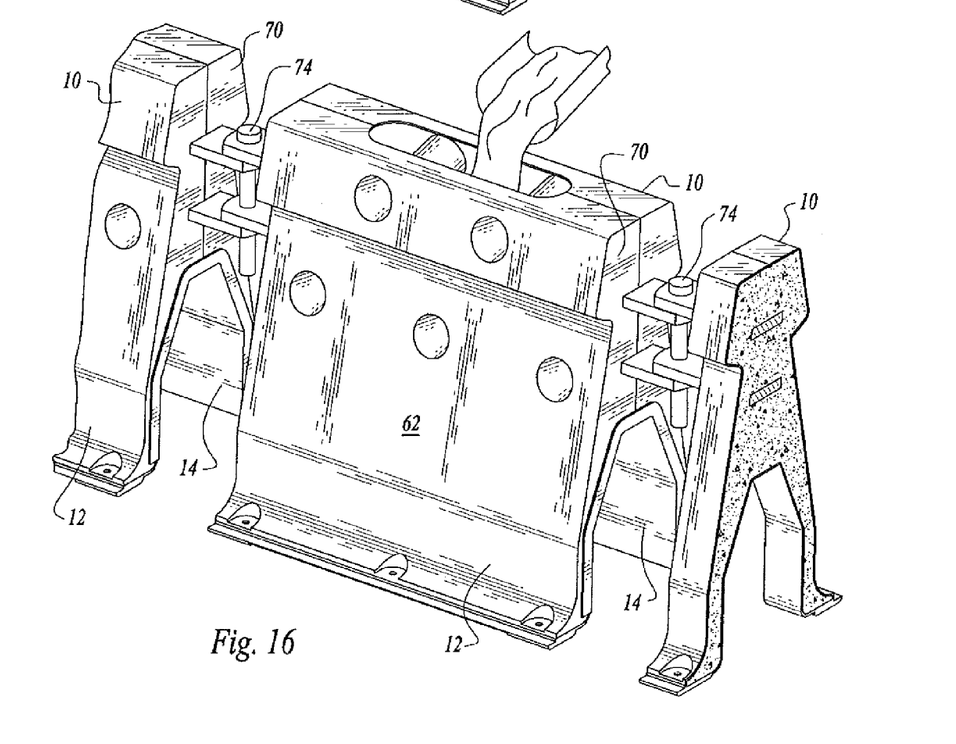
FIG. 16 shows the barrier module connected to adjacent barrier modules and being filled with concrete, one of the adjacent modules shown in cross-section having already been filled with concrete.
Figure 17:
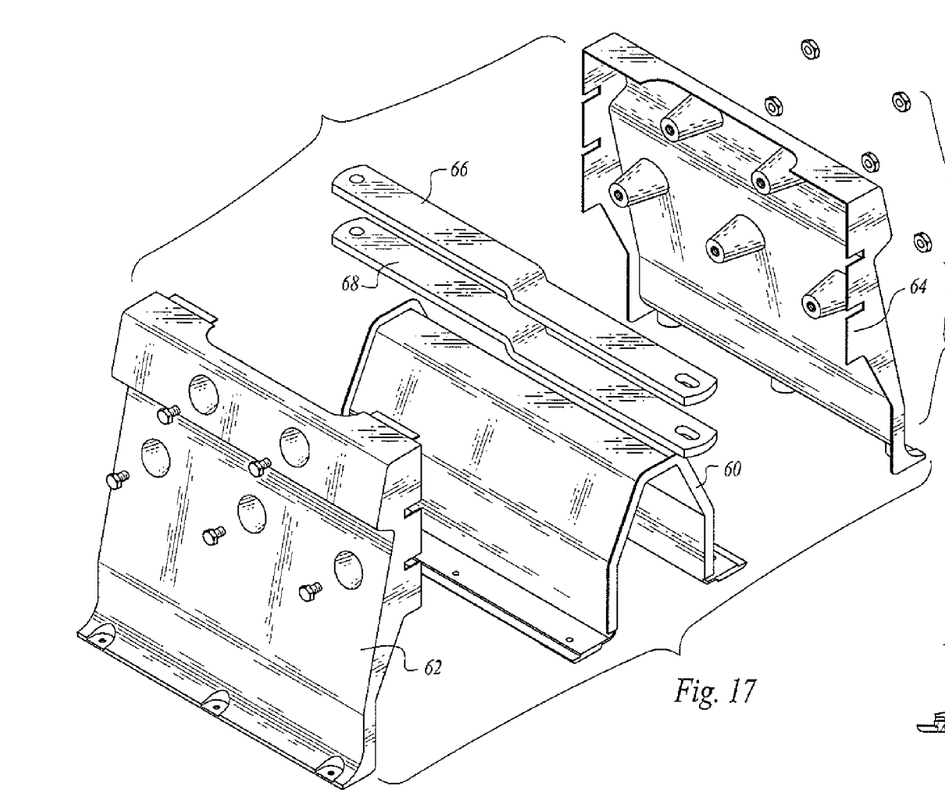
FIG. 17 is an exploded view of the components of an empty barrier module prior to assembly.
Figure 18:
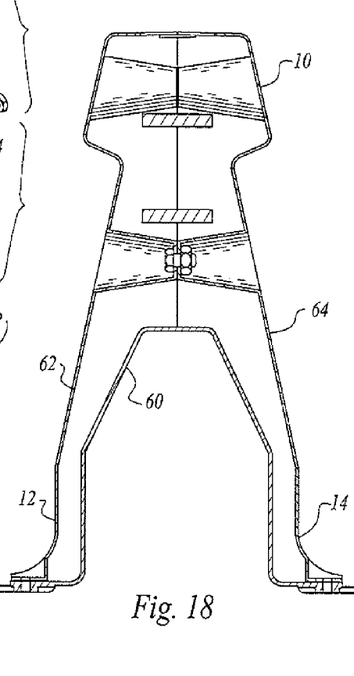
FIG. 18 is a cross-sectional end view of the barrier module after assembly.
Figure 19:
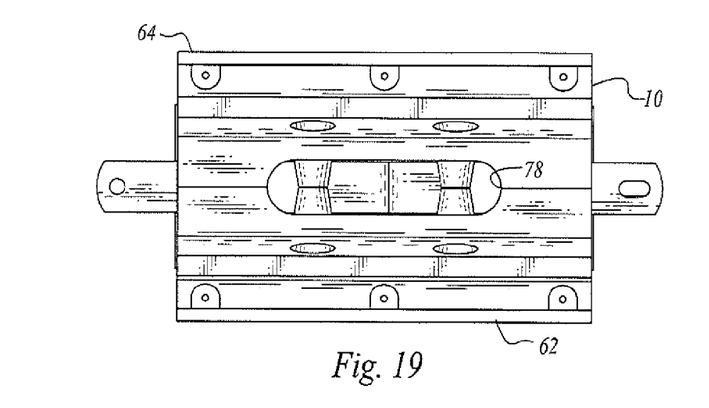
FIG. 19 is a top, plan view of the empty barrier module prior to being filled with concrete.
Figure 20:
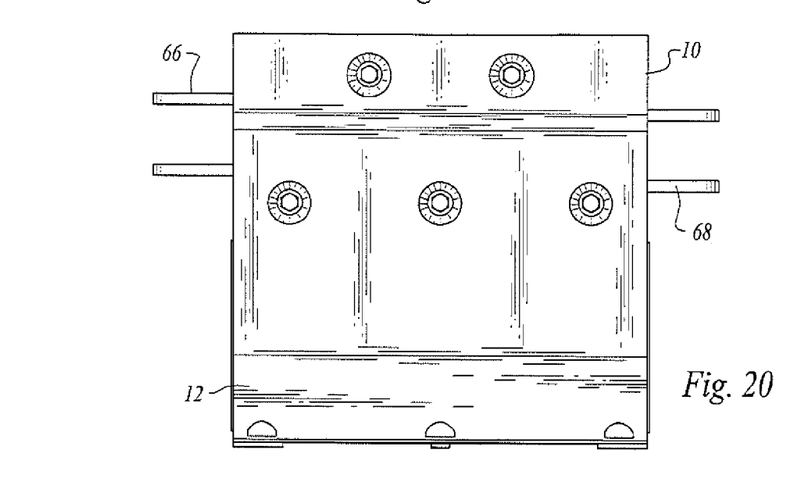
FIG. 20 is a side, elevational view of the barrier module.
Figure 21:
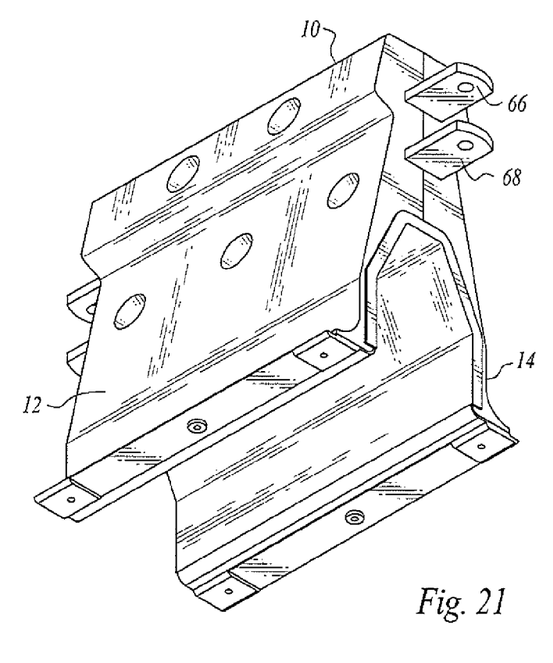
FIG. 21 is a bottom, perspective view of the barrier module.

Prior to assembly of the module housing, connector bars 66, 68 are installed so that the ends of the connector bars extend through slits formed in the housing ends 70. These bars cooperate with bars of adjacent modules as shown in FIG. 16, a pivot pin extending through aligned apertures at the bar ends to provide a pivotal connection between adjacent barrier modules. After the housing has been assembled with the connector bars in place, concrete is poured into an opening 78 at the top of the module housing to fill the housing with concrete and provide a solid, strong and secure barrier module. The connector bars are embedded in place, acting not only as secure elements of the pivot connector but performing the function of rebars as well.

Figure 22:
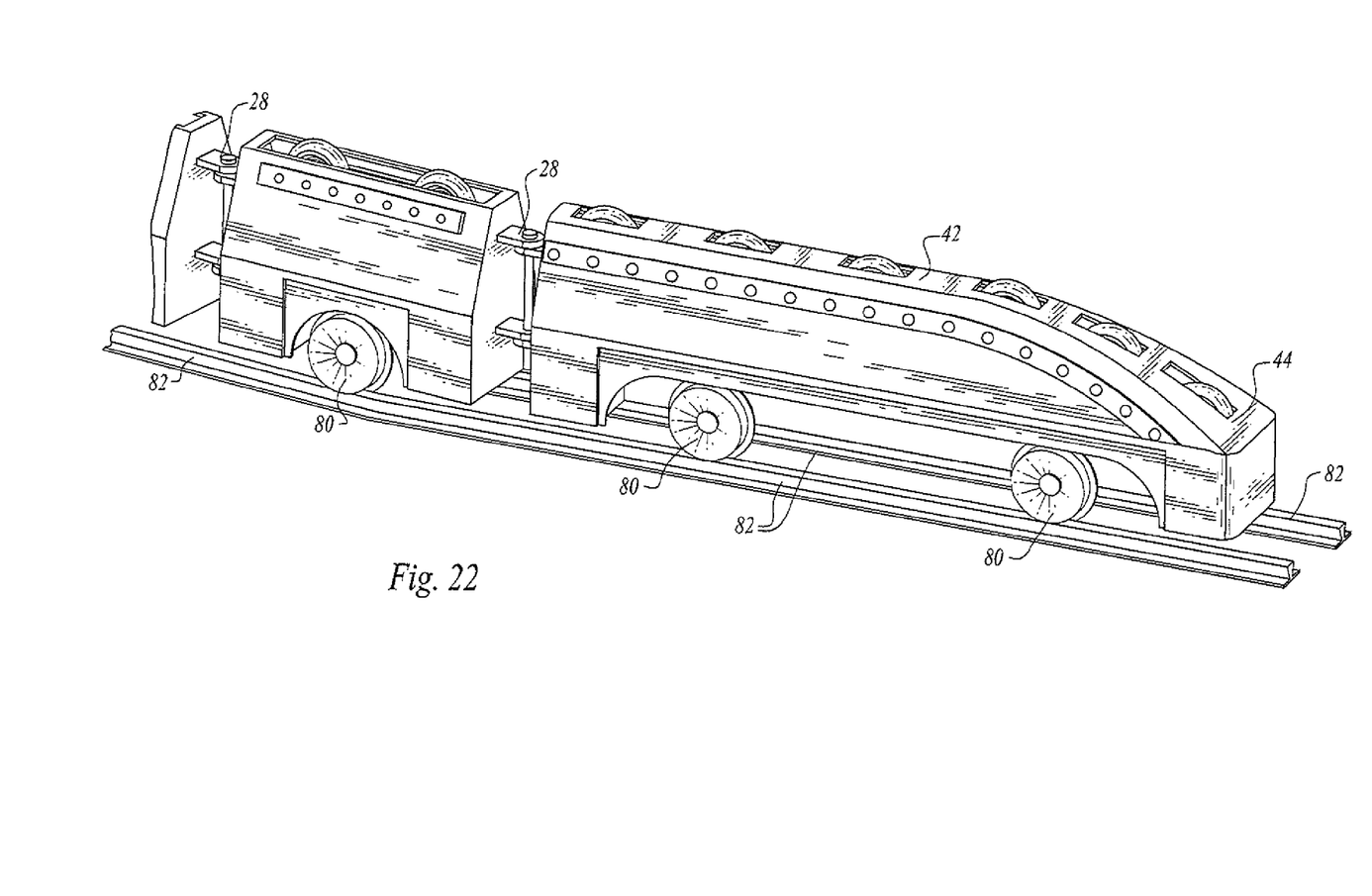
FIG. 22 is a view similar to FIG. 6, but illustrating an alternative embodiment wherein the barrier transport vehicle modules all have wheels which are supported by a guidance track.

FIG. 22 illustrates an alternative embodiment of the barrier transport vehicle wherein wheels 80 of all of the barrier transport vehicle modules are supported on and guided by a guidance track such as rails 82.

Other guidance means, such as a monorail arrangement, could be used to guide/steer the barrier transport vehicle.

The invention claimed is:

1. A barrier transport vehicle for transporting a barrier comprised of a plurality of barrier modules, each said barrier module including downwardly extending side portions having distal ends for positioning on a roadway or other support surface to support the barrier module, and said barrier module additionally having an inner surface defining a passageway extending through the barrier module between said side portions above and along said roadway or other support surface when positioned thereon, said barrier transport vehicle comprising a plurality of interconnected barrier transport vehicle modules for positioning in the passageways of barrier modules of the barrier and for engagement with the inner surface of the barrier modules to lift the engaged barrier modules off the roadway or other support surface and allow transport of the barrier by said barrier transport vehicle.

2. The barrier transport vehicle according to claim 1 comprising an articulated barrier transport vehicle with at least some of said barrier transport vehicle modules pivotally connected by pivot connection structure.

3. The barrier transport vehicle according to claim 2 wherein at least some of said barrier transport vehicle modules include steerable structure.

4. The barrier transport vehicle according to claim 3 wherein said steerable structure comprises wheels.

5. The barrier transport vehicle according to claim 3 wherein said steerable structure comprises caterpillar treads.

6. The barrier transport vehicle according to claim 1 wherein at least one of said barrier transport vehicle modules is self-propelled.

7. The barrier transport vehicle according to claim 1 wherein at least some of said barrier transport vehicle modules include height adjustment mechanism to cause engagement thereof with the inner surface of a barrier module and cause lifting of the engaged barrier module.

8. The barrier transport vehicle according to claim 1 wherein at least some of said barrier transport vehicle modules include barrier module engagement structure movable relative to the rest of the barrier transport vehicle module to facilitate initial positioning of the barrier transport vehicle module in a barrier module passageway.

9. The barrier transport vehicle according to claim 8 wherein said barrier module engagement structure is selectively lockable against movement relative to the rest of the barrier transport vehicle module when the barrier transport vehicle module is in the passageway of a barrier module to substantially prevent relative movement between the barrier transport vehicle module and the barrier module in which it is positioned.

10. The barrier transport vehicle according to claim 8 wherein said barrier module engagement structure comprises at least one rotatable member having a circular barrier module engagement surface.

11. The barrier transport vehicle according to claim 1 wherein at least some of said barrier transport vehicle modules are substantially equal in length to the barrier modules in which they are positioned.

12. The barrier transport vehicle according to claim 1 wherein at least one of said barrier transport vehicle modules has a tapered end for facilitating entry thereof into the passageway of a barrier module, and said tapered end engageable with the inner surface of the barrier module and operable during continued movement thereof within said passageway to lift the barrier module off the roadway or other support surface.

13. A method of transporting a barrier comprised of a plurality of barrier modules, each said barrier module including downwardly extending side portions having distal ends for positioning on a roadway or other support surface to support the barrier module, and said module having an inner surface defining a passageway extending through the module body between said side portions above and along said roadway or other support surface when positioned thereon, said method comprising the steps of:

locating a barrier transport vehicle comprising a plurality of interconnected barrier transport vehicle modules on the roadway or other support surface;

moving said barrier transport vehicle while on the roadway or other support surface and causing said barrier transport vehicle to be positioned in the passageways of barrier modules of the barrier;

causing engagement between the barrier transport vehicle modules and the inner surfaces of the barrier modules to lift the engaged barrier modules off the roadway or other support surface; and employing said barrier transport vehicle to transport the barrier while the engaged barrier modules are elevated relative to the roadway or other support surface.

14. The method according to claim 13 wherein the barrier transport vehicle comprises an articulated barrier transport vehicle with at least some of said barrier transport vehicle modules pivotally connected by pivot connection structure.

15. The method according to claim 14 wherein at least some of said barrier transport vehicle modules include steerable structure.

16. The method according to claim 15 wherein said steerable structure comprises wheels.

17. The method according to claim 15 wherein said steerable structure comprises caterpillar treads.

18. The method according to claim 13 wherein at least one of said barrier transport vehicle modules is self-propelled and is employed to move the barrier transport vehicle while on the roadway or other support surface and cause the barrier transfer vehicle to be positioned in the passageway of barrier modules of the barrier.

19. The method according to claim 13 wherein at least some of said barrier transport vehicle modules include height adjustment mechanism, said height adjustment mechanism employed to cause engagement thereof with the inner surface of a barrier module and cause lifting of the engaged barrier module.

20. The method according to claim 13 wherein at least some of said barrier transport vehicle modules include barrier module engagement structure, said barrier module engagement structure moved relative to the rest of the barrier transport vehicle module to facilitate initial positioning of the barrier transport vehicle module in a barrier module passageway.

21. The method according to claim 20 including the step of selectively locking the barrier module engagement structure against movement relative to the rest of the barrier transport vehicle module when the barrier transport vehicle module is in the passageway of a barrier module to substantially prevent relative movement between the barrier transport vehicle module and the barrier module in which it is positioned.

22. The method according to claim 20 wherein said barrier module engagement structure comprises at least one rotatable member having a circular barrier module engagement surface.

23. The method according to claim 13 wherein at least some of said barrier transport vehicle modules are substantially equal in length to the barrier modules in which they are positioned.

24. The method according to claim 13 wherein at least one of said barrier transport vehicle modules has a tapered front end for facilitating entry thereof into the passageway of a barrier module, and said tapered front end being engaged with the inner surface of the module and operable during continued movement thereof within said passageway to lift the barrier module off the roadway or other support surface.

25. The method according to claim 21 including the steps of unlocking the barrier module engagement structure and removing the barrier transport vehicle from the barrier after said barrier has been transported.

26. The method according to claim 13 including the step of employing guidance structure to guide movement of said barrier transport vehicle.

27. The method according to claim 26 wherein said guidance structure comprises a guidance track or monorail.

* * * * *